(No Model.) 3 Sheets—Sheet 1.

D. McCARTHY.
COMBINED HAY LOADER AND CARRIER.

No. 490,158. Patented Jan. 17, 1893.

WITNESSES:
Chas. Nida
C. Sedgwick

INVENTOR
D. McCarthy
BY
ATTORNEYS.

(No Model.) 3 Sheets—Sheet 2.
D. McCARTHY.
COMBINED HAY LOADER AND CARRIER.

No. 490,158. Patented Jan. 17, 1893.

(No Model.) 3 Sheets—Sheet 3.

D. McCARTHY.
COMBINED HAY LOADER AND CARRIER.

No. 490,158. Patented Jan. 17, 1893.

WITNESSES:
Chas. Nida
C. Sedgwick

INVENTOR
D. McCarthy
BY
ATTORNEYS.

UNITED STATES PATENT OFFICE.

DENIS McCARTHY, OF COLUMBUS, OHIO.

COMBINED HAY LOADER AND CARRIER.

SPECIFICATION forming part of Letters Patent No. 490,158, dated January 17, 1893.

Application filed April 29, 1892. Serial No. 431,196. (No model.)

*To all whom it may concern:*

Be it known that I, DENIS MCCARTHY, of Columbus, in the county of Franklin and State of Ohio, have invented a new and useful Improvement in a Combined Hay Loader and Carrier, of which the following is a full, clear, and exact description.

My invention relates to an improvement in combined hay loaders and carriers, and has for its object to provide a machine of this description of exceedingly simple, durable and economic construction, capable of gathering the hay from the ground and delivering the same to a box or receptacle located upon the forward portion of the machine, in which box or receptacle the hay is to be carried to the stack.

Another object of the invention is to so construct the carrier or storage box or receptacle that the sides and top thereof, when the machine is in operation, will be composed of a series of strands of cable or chain, to provide a means when the load is to be removed, for the side cables or chains to be disengaged in such a manner as to expose the load, and whereby also a simple mechanism will be provided for simultaneously tightening all of the cables connected with the storage receptacle.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
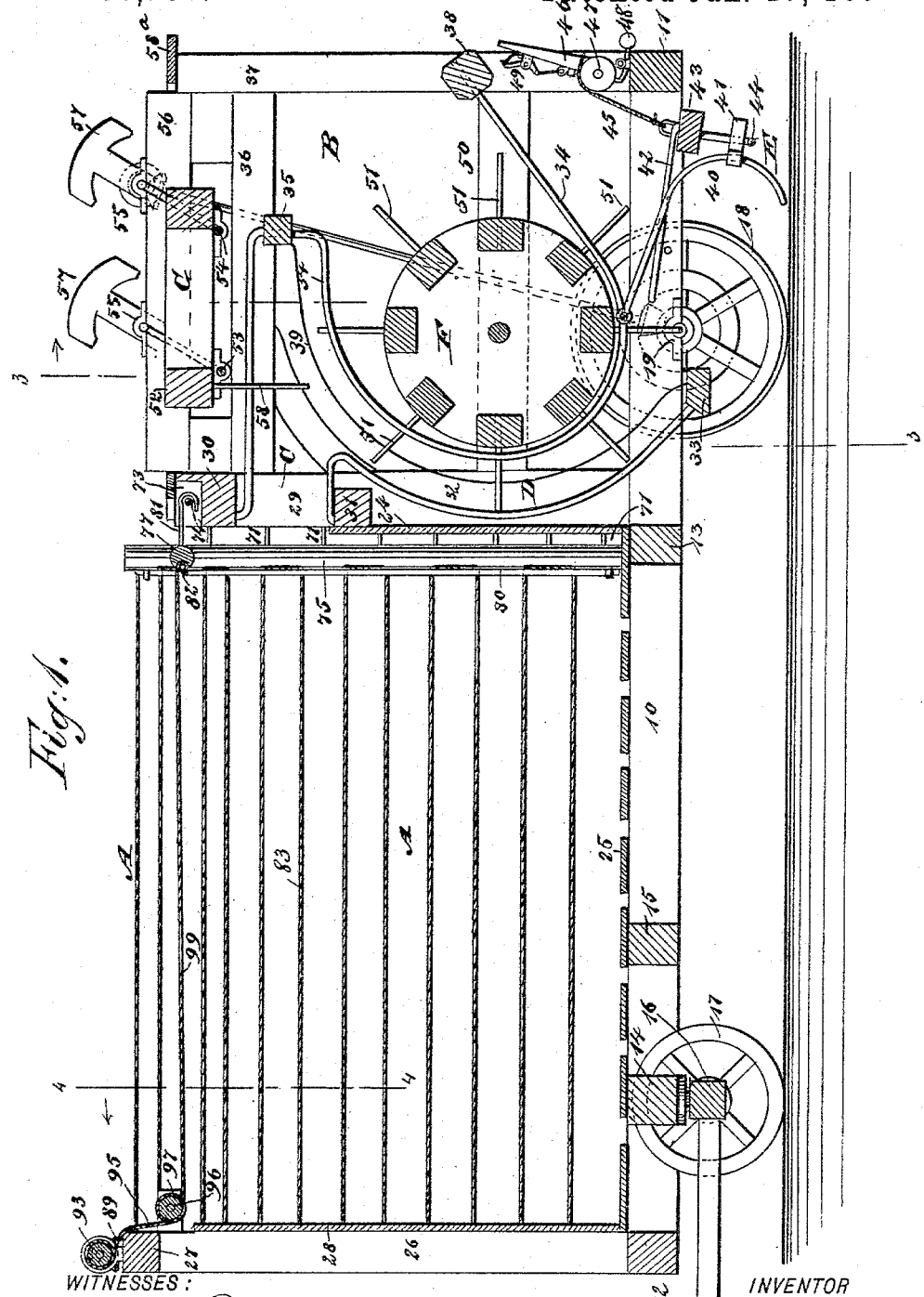
Figure 2:
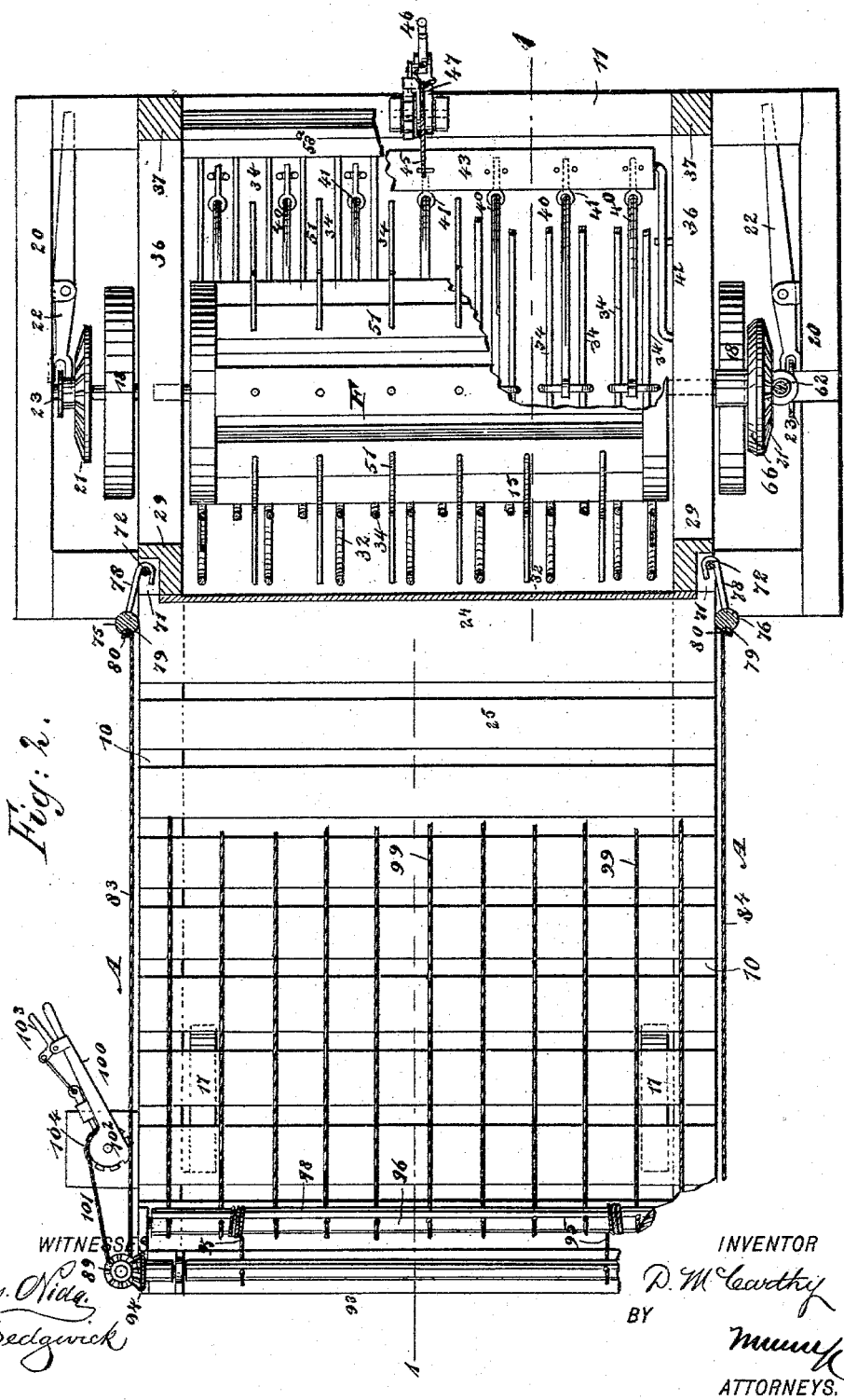
Figure 3:
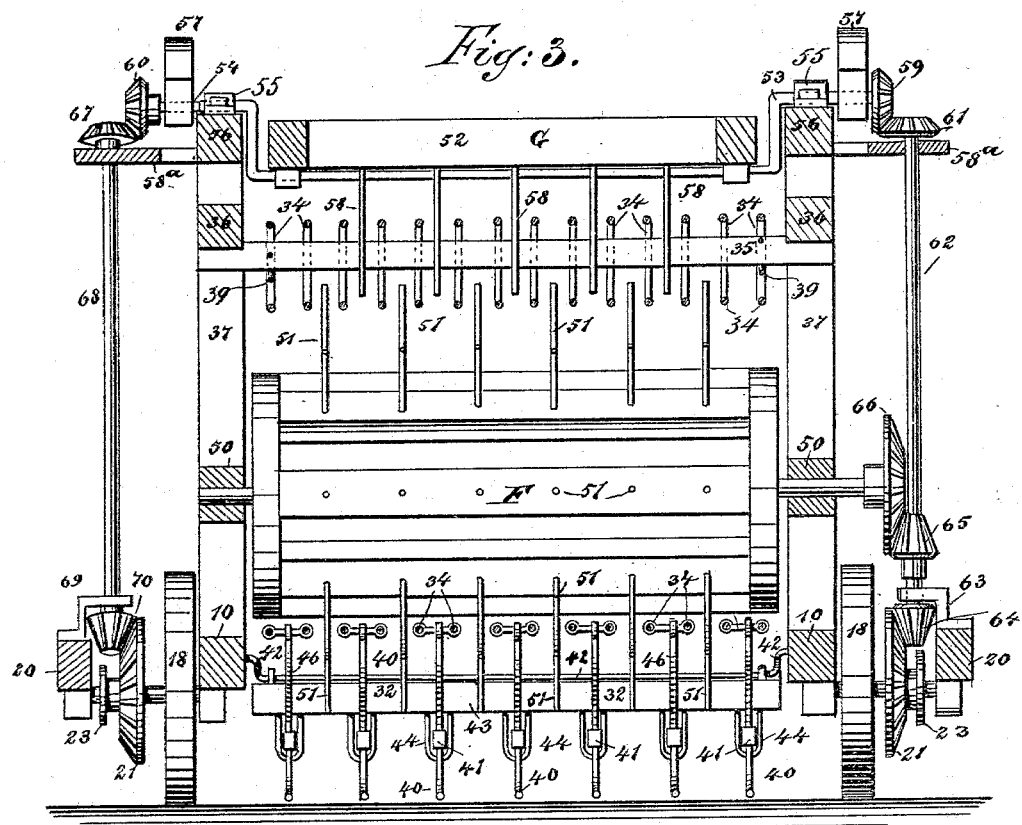
Figure 4:
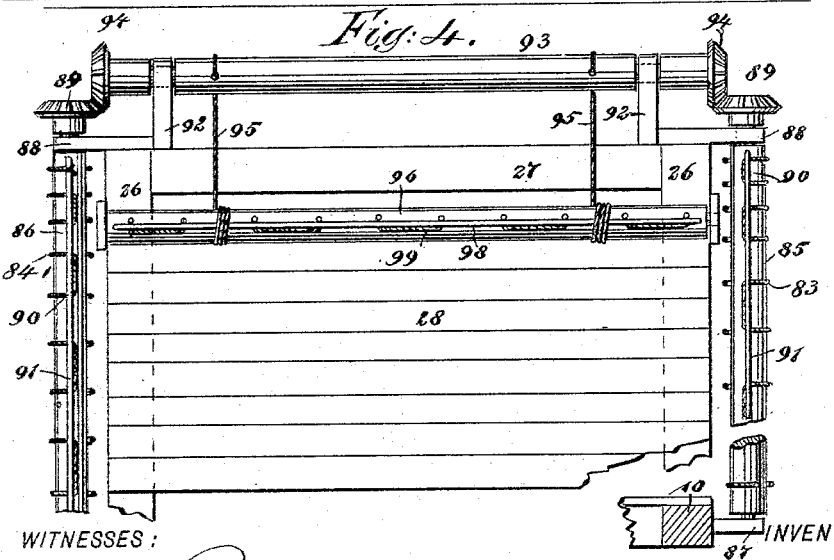

Figure 1 is a longitudinal vertical section through the machine, taken practically on the line 1—1 of Fig. 2; Fig. 2 is a plan view of the storage chamber, a portion of the upper cables or chains being broken away and likewise one corner of the chamber, and this view also represents a partial horizontal section of the body portion of the machine; Fig. 3 is a transverse section taken practically on the line 3—3 of Fig. 1; and Fig. 4 is a transverse section taken practically on the line 4—4 of Fig. 1.

The base frame of the machine consists of two parallel side beams 10, front and rear end beams 11 and 12, a rear intermediate beam 13, spaced some distance from the rear end beam, and forward intermediate beams 14 and 15, located near the front cross beam. The forward axle 16, is pivoted upon the forward intermediate beam 14, and this axle carries two small supporting wheels 17. The rear wheels 18 of the machine, are secured to axles held to turn in bearings 19, attached to the side beams of the base about midway between the rear end beam 11 and the rear intermediate beam 13. Each axle at its forward or outer end is journaled in an extension 20 of the base frame, one of the extensions being located at each side of the main portion of the base, as shown in Fig. 2; and each axle carries a bevel gear 21, the said gears being splined upon the shaft so that they may be moved to and from the drive wheels 18, the said wheels being moved through the medium of levers 22, fulcrumed beneath the extension 20, the forward ends of which levers are preferably forked to engage with flanged hubs 23, forming a portion of the beveled gears.

The machine is divided into two compartments by a partition 24, which partition is preferably located over the rear intermediate beam 13. This partition is not as high as the remaining portion of the upper structure of the machine to be hereinafter described, and the partition produces a storage compartment A and a raking or delivery compartment B. The storage compartment is provided with a slatted bottom 25, as is best shown in Fig. 1; and at the forward end of the base, at each side, an upright 26, is located, the uprights being connected by a cross bar 27, and the uprights constitute supports for a forward partition 28, the rear partition 24 and the forward partition 28 defining the length of the storage compartment. The rear partition 24, is secured to uprights 29, secured at their lower ends to the base, preferably slightly back of the intermediate rear cross bar 13; and these uprights 29, are connected at their upper ends by an upper cross bar 30, this bar being slightly lower than the forward upper cross bar 27, as is best shown in Fig. 1. The upper edge of the partition 24, is attached to a head block 31, made in the form of a beam, extending from one upright 29 to the other. Between the head block 31 and the upper cross bar 30, a space C, is left, and by reason of this space communication is established between the front and the rear compartments of the machine.

A throat D, is made to lead from the lower portion of the raking compartment B to the space C; and this throat extends from side to side of the machine. One side of the throat, that is, its forward side, is constructed of a series of stout metal rods 32, arranged at predetermined intervals apart, the upper ends of which rods are secured in the upper surface of the head block 31, the rods being carried a short distance horizontally rearward, and then in a semi-circle downward to a point below the base frame, at which point they are secured in a tie-bar 33, the said bar being attached in any approved manner at its extremities to the under face of the base frame or extensions formed thereon. In carrying the forward throat rods 32 downward their convexed surfaces face to the front and their concaved surfaces to the rear, their convexed surfaces being made to approach quite closely the rear face of the intermediate partition 24. The rear wall of the throat D, consists of a series of bars 34, arranged in pairs, the pairs of bars being so located as to alternate with the forward throat rods 32. The rear throat rods or bars are secured at their upper ends in the under surface of the upper intermediate cross bar 30, from whence they are carried horizontally rearward preferably a slight distance beyond the vertical central portion of the raking chamber, and thence vertically downward through a cross bar 35, secured at its ends in side bars 36, which side bars are secured at their forward ends to the uprights 29, and at their rear ends to corresponding uprights 37, erected at the sides of the base frame at the rear, as is best shown in Fig. 1. After passing through the cross bar 35 the rear sets of throat bars are curved forwardly and are carried downward concentric with the curved portions of the forward throat bars 32. The sets of rear throat bars, however, are not continued downward as are the forward throat bars, but are curved upward and rearward, and their rear ends are secured in a tie bar 38, the said bar being secured between the rear uprights 37, preferably at or near the central portions of said uprights, as is likewise best shown in Fig. 1. Thus a throat is formed open at its lower end, the entrance to the throat being at the tie-bar 33, and this throat leads upward in semi-circular form to a direct communication with the space C between the two main compartments of the machine, the upper portion of the throat being quite wide. This throat, as heretofore stated, extends from side to side of the machine, and at each side of the machine wires are preferably arranged so as to close the throat at its ends, or practically close it, the said wires being designated as 39.

In connection with the throat a ground rake E, is employed. This ground rake consists of a series of teeth 40, pivoted at their upper ends, one tooth between the rear throat bars of each pair. The teeth extend rearwardly, and are curved sharply downward and forwardly in direction of the ground, and each rake tooth at its bow section is provided with a rearwardly extending lip 41. These lips are adapted for use in elevating the teeth, and this is accomplished in the following manner: The ends of a crank shaft 42, are pivoted in the side pieces of the base frame back of the axles of the rear wheel, the body or crank arm of the shaft being located near the extreme rear portion of the machine, and it extends practically from side to side of the machine across a head block 43, to which head block the crank arm is secured. This head block is provided with a series of staples or eyes 44, projected vertically downward from its under face, the staples corresponding in number and location to the number and position of the rake teeth, and each staple is adapted to receive a lip 41 of a rake tooth. The teeth are raised from the ground the desired distance by attaching to the central portion of the head block one end of a rope or chain 45, the opposite end of said rope or chain being attached to a lever 46 fulcrumed at the rear of the machine, as shown in Fig. 1; and the rope or chain 45, passes over a peripherally grooved wheel 47, attached to the lever 46, and the lever is prevented from moving from the position in which it is placed through the medium of latches of any approved description, two latches being shown in the drawings, one a gravity latch 48, which engages with the under portion of the wheel 47, and the other a thumb latch 49, connected with the lever and adapted for engagement with a suitable rack located upon the frame. Either or both of these latches may be employed. It is obvious that by the manipulation of the lever 46, the ground rake may be raised or lowered as required, and also that each tooth of the rake is free to have a limited vertical and guided movement, as should any of the teeth strike an obstruction while the machine is being drawn forward the tooth is free to rise a distance equal to the length of the staple through which its lip passes.

Adjacent to the rear throat bars and within the space surrounded or partially surrounded by the curved portions of said bars, a drum F, is journaled, the shaft of the drum being held to turn in suitable side bars 50, secured to the uprights 29 and 37. This drum is provided with a series of radially arranged teeth 51, the teeth being placed in rows extending straight across the drum from end to end thereof, and the rows of teeth may be arranged in such manner that one tooth will be immediately back of the other, circumferentially, or whereby the teeth of one row will be staggered in their arrangement with respect to the teeth of the next row. The teeth, however, are at all times so arranged that as the drum rotates, which is to be in direction of the front of the machine, the teeth will clear the throat bars.

In addition to the ground rake, an upper feed rake G, is employed. This feed rake consists of a frame 52, preferably rectangular in general contour, and this frame is mounted upon two crank shafts 53 and 54, the crank shafts passing beneath and being attached to the under surfaces of the frame, one at its forward and the other at its rear side. The crank arms of the crank shafts extend upward over and beyond the ends of the frame, and are journaled in bearings 55 of any suitable character located upon beams 56, which beams are placed between the upper ends of the uprights 29 and 37 and extend above the upper faces of said uprights. Each crank arm of each crank shaft is provided with a counterbalancing weight 57, the weights being adapted to add momentum to the feed rake as it is revolved, and cause it to act with considerable force upon the hay to be delivered to the storage compartment. The frame G, is provided with one set of teeth 58, only, and this set of teeth is arranged longitudinally of the frame and extends perpendicularly downward from the under side of its forward edge, the arrangement of the teeth being such that they will enter the upper portion of the throat between the sets of bars defining its rear side. The upper portion of the framing of the rake compartment is surrounded by a guard 58$^a$, and the crank arms of the crank shafts 53 and 54 extend over this guard. Upon the extremity of the left-hand crank arm of the crank shaft 53 carrying the feed rake, a miter gear 59, is secured; and upon the right-hand crank arm of the opposite crank shaft 54, a similar gear 60, is fastened. The bevel gear 59 at the upper or left-hand side of the machine meshes with a similar gear 61 located above the guard rail 58$^a$, and attached to a shaft 62, which shaft extends downward, and near its lower end is journaled in a bearing 63, secured to the left-hand extension 20 of the main frame. The shaft 62, carries at its lower end a beveled pinion 64, which is adapted to mesh with the shifting beveled gear 21 upon the left-hand axle, as shown in Fig. 3. Through the medium of this engagement motion is communicated to the upper or feed rake; but the rake also receives motion in similar manner from the opposite or right-hand shaft, as will be shortly described. The shaft 62, in addition to carrying the lower beveled pinion 64 carries another beveled pinion 65, and this pinion meshes with a bevel gear 66, which is fast upon the left-hand end of the drum axle, as is likewise shown in Fig. 3. It will thus be observed that through the medium of the left-hand axle of the machine the drum is revolved, and motion is likewise communicated to the upper feed rake; it is further evident that by shifting the gear 21 upon the left-hand axle in direction of the left-hand supporting wheel the gear will be disconnected from the pinion 64, and further motion will not be imparted to the upper rake.

With reference to the rake-driving mechanism at the right-hand side of the machine, the gear 60 attached to the crank shaft 54, meshes with a gear 67, located above the guard 58$^a$ and secured to the upper end of a shaft 68, which shaft extends downward and is journaled in a bearing 69, secured upon the right-hand extension 20 of the base; and the lower end of this shaft carries a beveled pinion 70, which is adapted to mesh with the shifting gear 21 on the right-hand axle. When it is desired to stop the movement of the upper or feed rake, both of the shifting levers 22, are manipulated to throw the shifting gears 21 out of engagement with the pinions on the drive shafts 62 and 68 of the upper rake.

It is obvious that in the operation of the machine, the hay gathered by the ground teeth will be conveyed to the mouth of the throat D, at which point it will be engaged by the teeth of the drum F and will be carried upward by these teeth into the upper enlarged portion of the throat, at which place it will be engaged by the teeth of the upper rake, or feed rake, and will be forced by the teeth of that rake through the opening or space C over the intermediate partition 24 into the storage compartment A. The upper or feed rake makes a complete rotary movement, and these teeth enter at the rear upper portion of the throat, thus taking the hay from that point and carrying it directly to the opening, as in the forward throw of the upper rake these teeth closely approach the opening. It is obvious that the teeth of the rake drum will clear themselves of hay as they pass outward from the throat since they closely approach the rear bars of the throat.

The intermediate uprights 29, are provided in their outer faces with a series of horizontal recesses 71 at intervals from top to bottom, and through all of the recesses of each upright 29 a pin 72, is passed. The upper cross bar 30 connecting the uprights 29, is likewise provided with a series of apertures 73, and these apertures are horizontally located, extending from end to end at intervals apart, and a pin 74, is passed through all of the recesses. Each upright 29, is adapted to carry a vertical bar, and these bars are designated as 75 and 76. The upper cross bar 30, is adapted to support a horizontal bar 77. The vertical bars 75 and 76, are provided upon one face with a series of hooks 78, which hooks are adapted to enter the recesses 71 in the uprights 29 and embrace the pins 72, as shown in Fig. 2; and each of these bars is provided upon its forward face with a series of horizontally arranged recesses 79, and through these recesses a vertical pin 80, is passed. The upper bar 77, is likewise provided upon its rear surface with a series of hooks 81, adapted to enter the recesses 73 in the upper cross beam 30, and to engage with the pin 74 in that beam; while, as has been described with reference to the vertical bars, the horizontal bar 77, is provided in its inner face with a series of recesses vertically arranged, through which recesses a pin 82 passes. The bars 75 and 76, are adapted to carry cords constituting the sides of the storage compartment, the right-hand cords being designated as 83 and the left-hand cords as 84, and these cords are also adapted for attachment to vertical rollers 85 and 86. These rollers are located outside of the front uprights 26 and are journaled at their lower ends in bearings 87, secured to the base frame, and at their upper ends in bearings 88, projected from the upper face of the upper front cross bar 27. At their upper ends the rollers are provided with beveled gears 89, and in one face of each roller a series of horizontally located recesses 90, is produced, which recesses are crossed by pins 91.

Preferably each side of the storage compartment is formed by a continuous length of cable or chain. These cables or chains are attached at their upper ends to the upper portions of the vertical fixed bars 75 and 76, and they are carried across to the opposing vertical rollers 85 and 86 through the recesses in said rollers, around the pins 91 and likewise through the recesses 79 in the fixed bars 75 and 76 and around the pins therein, and in this manner the cables or chains are carried from the fixed bars over the rollers and back to the bars until the sides of the storage chamber are inclosed by a series of horizontal strands located at predetermined distances apart.

Brackets 92, are secured upon the upper face of the forward upper cross bar or beam 27, and in these brackets a horizontal roller 93, is journaled, provided with miter gears 94 at its extremities, meshing with the gears 89 of the upright rollers 85 and 86. The horizontal roller 93, is connected by cords or chains 95, with a lower horizontal roller 96; this lower roller is journaled in bearings 97, attached to the front uprights 26 below the upper cross beam 27, as is shown in Fig. 1, and the cords 95, are secured to the upper roller 93, and are wound around the lower roller 96, as shown in Fig. 4. The roller 96, is provided with a series of apertures, shown in Fig. 4, and a longitudinal pin 98, extending from end to end. Cords or cables 99, are run from this lower roller 96 to the upper rear fixed bar 77, in the same manner that has been heretofore described in connection with the side cords or cables. Thus it will be observed that the storage compartment is inclosed at its sides, and also at its top, by a net-work of cords or cables, and that these cords or cables may be readily removed to render the contents of the storage compartment accessible by removing the upper rear bar 77 and the rear vertical bars 75 and 76 from their connections with the frame. The side sets of cords or cables extend above the upper set, and this extension is made in order that when the compartment A is filled and more hay should be crowded therein, the excess of hay will not be pressed over the sides of the compartment.

It is desirable that when all of the cords or cables have been placed in engagement with the frame they should be tightened simultaneously and expeditiously. This is accomplished through the medium of a lever 100, journaled at one side of the machine near the front, as shown in Fig. 2; and a cord 101, is wound around one of the forward vertical rollers 85 and 86, and is carried over a disk 102, formed integral with the lever, and having a peripheral groove to receive the cord, the cord being secured to this disk. The lever is held in any position desirable by means of a latch 103, connected with it and adapted for engagement with a rack 104, placed upon the disk, as shown best in Fig. 2. It will thus be observed that by moving the lever 100 in direction of the frame the side rollers will be revolved and will take up any slack that may exist in the side cables, while motion is communicated to the upper roller 93 from the side rollers, and from the upper roller to the lower horizontal roller 96, which latter roller by being rotated, will take up whatever slack there may exist in the upper line of cables.

Having thus described my invention, I claim as new, and desire to secure by Letters Patent,—

1. A hay loader and carrier, comprising the frame work, its supporting wheels, a rotary toothed drum in the rear end of the frame above the rear wheels, parallel crank shafts mounted above the drum, the rake carried by the said shafts, vertically extending shafting geared to the rear frame wheels, the drum and said crank shafts, a rake beneath the drum, a throat D, curved from the rake forwardly upwardly and rearwardly around the drum and beneath the upper rake, an opening or passage C leading forwardly from the upper portion of the throat into the front portion or storage compartment of the said frame, substantially as set forth.

2. The combination with the frame having a mechanism at its rear end for raking elevating and discharging the hay into the forward portion of the frame, of a series of strands or cords forming the sides of the said forward portion or compartment, and a bar at one end of each series of cords provided with hooks, and vertical rods on the frame with which the hooks are adapted to engage, substantially as set forth.

3. In a hay loader and carrier, the combination, with a supporting frame provided with a storage compartment, a throat leading from the upper part of the storage compartment down below the frame, and a mechanism for feeding the hay from the throat into the said storage compartment, of a crank shaft journaled opposite the mouth of the throat, a head block secured to the crank shaft and provided with downwardly extending staples or eyes, rake teeth pivoted to the throat bars, and extending at their rear downwardly curved ends adjacent to said head block, lips 41 projecting rearwardly from the rake teeth and entering the staples or eyes of the head block, and an adjusting lever connected with the head block, substantially as and for the purpose set forth.

4. In a hay loader and carrier, the combination, with a supporting frame provided with uprights connected by cross bars, of a roller journaled above one set of uprights, rollers journaled at the sides of the said uprights and geared with the upper roller, bars provided with hooks adapted for engagement with the sides of the opposite set of uprights, a horizontal bar also provided with hooks and adapted for engagement with the cross bars of the latter uprights, a roller journaled below the said upper roller, cords connecting the vertical rollers and the vertical bars, cords connecting the horizontal bar and the lower roller, a winding connection between the upper and lower roller, and a lever for imparting movement to one of the two rollers, substantially as and for the purpose set forth.

5. In a hay loader and carrier, the combination, with a frame provided with a storage compartment having contractible and expansible sides and top, the said sides and top being removable at one of their ends from the frame, a toothed drum journaled near one end of said storage compartment, and a throat receiving the teeth of the drum and extending from beneath the latter upward into the storage compartment, of a series of rake teeth pivotally attached to the throat bars, a crank shaft journaled in the frame back of the rake teeth, staples or eyes extending downward from the crank shaft, lips projected from the rake teeth and extending into the staples or eyes, an adjusting lever connected with the crank shaft, a feed rake located above the throat, the teeth of which extend down into it, and a means for imparting a rotary reciprocating movement to the feed rake, substantially as shown and described.

DENIS McCARTHY.

Witnesses:
JNO. P. PATTERSON,
ALONZO C. STRONG.